United States Patent [19]
Brister et al.

[11] Patent Number: 5,597,048
[45] Date of Patent: *Jan. 28, 1997

[54] ACCELERATOR PEDAL OVERRIDE APPARATUS FOR SELF-PROPELLED MOTORIZED CART WITH ALIGNED BRAKE AND ACCELERATOR PUSHROD TYPE OPERATOR PEDALS

[75] Inventors: Charles Brister, Amite, La.; Dale Schenkel, Yankton, S. Dak.

[73] Assignee: Charles C. Brister, Amite, La.

[ * ] Notice: The term of this patent shall not extend beyond the expiration date of Pat. No. 5,477,940.

[21] Appl. No.: 577,842

[22] Filed: Dec. 22, 1995

Related U.S. Application Data

[63] Continuation of Ser. No. 370,107, Jan. 9, 1995, Pat. No. 5,477,940.

[51] Int. Cl.⁶ ................................................. B60K 41/20
[52] U.S. Cl. .......................................... 180/292; 180/307
[58] Field of Search ................................... 180/292, 293, 180/307

[56] References Cited

U.S. PATENT DOCUMENTS 2,051,375  8/1936  Harrison ................................. 180/292
4,253,535  3/1981  Kleine et al. ........................... 180/292
4,445,329  5/1984  Drisko ..................................... 180/307

Primary Examiner—Brian L. Johnson
Assistant Examiner—F. Zeender
Attorney, Agent, or Firm—Pravel, Hewitt, Kimball & Krieger

[57] ABSTRACT

A motorized cart apparatus includes a cart frame having front and rear portions and a wheel base defined by a pair of front steerable wheels and a pair of rear wheels. A seat is positioned between the front and rear wheels and a motor drive or engine positioned at the rear end portion of the frame behind the seat and adjacent the rear wheels. Brake and accelerator pedals are positioned side by side at the front of the cart inside the front wheels and on opposite sides of the steering column, and inclined steering rod that extends from the frame upwardly toward the user. A throttle cable controls the motor. The throttle cable is activated by a pushrod extending between the accelerator pedal and the engine. A brake pushrod extends between the brake pedal and rear brake so that when the brake pedal is depressed, the pushrod activates the brake. A linkage extending from the brake pushrod to the throttle returns the throttle to an idle position when the brake pedal and accelerator are simultaneously depressed as when the car driver panics.

10 Claims, 4 Drawing Sheets

ACCELERATOR PEDAL OVERRIDE APPARATUS FOR SELF-PROPELLED MOTORIZED CART WITH ALIGNED BRAKE AND ACCELERATOR PUSHROD TYPE OPERATOR PEDALS

This is a continuation of copending application Ser. No. 08/370,107, filed Jan. 9, 1995, now U.S. Pat. No. 5,477,940.

BACKGROUND OF THE INVENTION

1. Field of the Invention

The present invention relates to small wheel self-propelled carts, commonly referred to by the slang term "go-karts". Such small powered carts are commonly used on tracks set up at fairs, fun parks, and resort areas but are also used by young people off-road. "Go-Karts" typically include an elongated chassis that is spaced a short distance (6–8 inches) from the underlying surface, powered by a small rear engine placed behind a seat that is positioned at the middle of the chassis and where a pair of pedals have pushrods that extend along the left and right sides of the chassis centerline respectively to activate an aft vehicle brake and the accelerator of the rear mounted engine. More particularly the present invention relates to an improved small motorized, self-propelled cart that includes an override activated by a brake pushrod extending between the brake pedal and the rear brake for returning the engine to idle speed whenever the user depresses the brake—even in situations where the user depresses both the brake and the accelerator pedals simultaneously.

2. General Background

Small powered, self-propelled karts have been sold for many years, typically using a metallic chassis having four small wheels about twelve inches (12") in diameter, a relatively small internal combustion engaging (for example 5–10 horsepower) positioned at the rear of the chassis, a seat positioned just aft the middle of the chassis and a steering wheel assembly that extends from the front of the chassis up to the user.

These go-karts provide a pair of pedals that include a left brake pedal and a right accelerator pedal closely positioned together at the front of the vehicle. The pedals activate pushrods which control respectively the accelerator and brake. A common go-kart arrangement a left forward brake pedal that activates a brake pushrod, the pushrod engaging a rear brake band that tightens against a drum on the rear left wheel. The right forward pedal provides an accelerator pedal that activates a pushrod for operating a retractable cable to increase the speed of the engine from idle to higher running speeds.

One of the problems with go-karts of this type is the problem of user panic when an object such as a tree, fence, wall or the like is quickly presented to the user in a panic situation. This can be a common problem, especially with first time users. Parents often purchase go-carts for children that are to young to obtain a driver's license. The cart functions as their first vehicle. Therefore, such carts are primarily used off-road where trees, fences, houses, and the like must be reckoned with.

When the operator of a go-kart panics, a possible reaction is the depression of the accelerator pedal rather than the brake pedal. Sometimes, the user can panic and depress both the accelerator pedal and the brake pedal. Sometimes, this instant of adverse reaction can cause the user to loose control or to hit an object that otherwise could have been avoided by turning or braking.

SUMMARY OF THE INVENTION

The present invention solves this prior art problem user panic by providing a safety override system for go-karts that have closely positioned brake and accelerator pedals which are activated by the user and which depressed pushrods that extend the full length of the vehicle chassis. In karts of this type, the pushrods extend to the rear of the vehicle and operate respectively a brake arrangement on the left for example and an accelerator arrangement on the right.

The present invention provides a safety override apparatus for such go-kart devices that returns the engine to idle speed whenever the user depresses the brake pedal and even in situations where the user simultaneously depresses the brake and the accelerator pedals. This solves a prior art problem that has plagued go-karts by returning the vehicle engine to idle speed whenever the brake pedal is depressed, and even when both brake and accelerator are depressed.

The apparatus of the present invention thus includes a chassis having front and rear wheels and left and right pedals positioned adjacent one another at the front of the chassis. A chassis includes a steering wheel with an inclined steering rod that extends upwardly in an inclined position relative to the chassis and presenting the steering wheel to the user's arm and chest area.

The brake pedal is on the left side of the chassis, to the left of the steering rod. The accelerator pedal is positioned to the right of the steering rod at the right front of the chassis. Each of the brake and the accelerator pedals has a pushrod associated therewith. Each of the pushrods extends the full length of the chassis, to a position adjacent the rear axle. The brake pushrod activates a brake that engages the left rear wheel. The right pushrod communicates with an accelerator linkage that operates the engine throttle.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
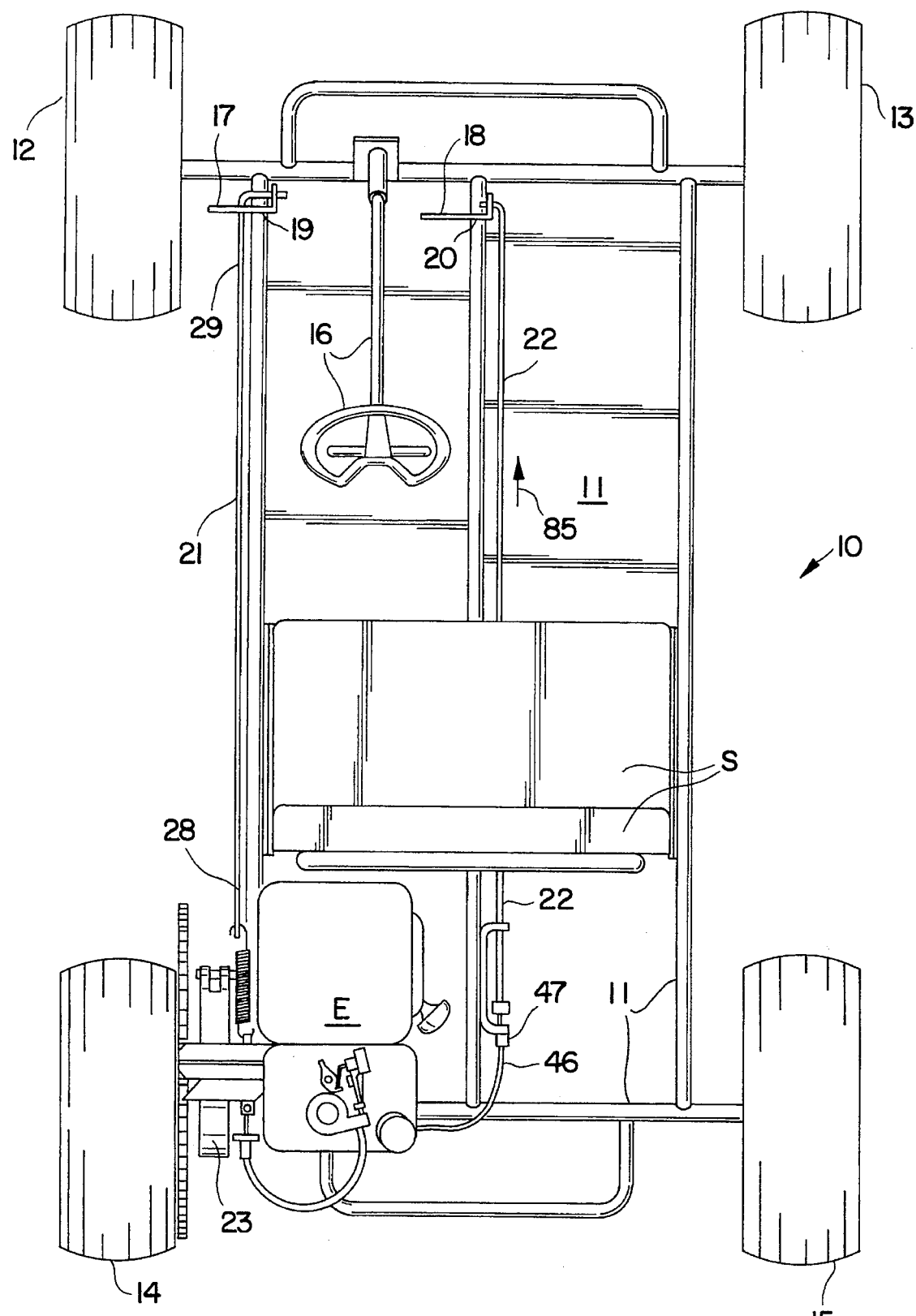
FIG. 1 is a top view of the preferred embodiment of the apparatus of the present invention.

FIG. 1 shows the preferred embodiment of the apparatus of the present invention designated generally by the numeral 10.

Self propelled go-kart apparatus 10 includes an elongated chassis 11 that sits relatively close to the underlying ground surface such as for example about 6–8 inches from the underlying ground. The chassis 11 has a pair of front wheels 12, 13 that are steerable. A pair of rear wheels 14, 15 are also provided, mounted on a rear axle. The left rear wheel 14 has a brake drum and a brake band that encircles the drum. When the user depresses the brake pedal, a pushrod tightens the brake band about the drum in a manner known in the art.

A steering wheel/steering rod assembly extends from the front end portion of the chassis 11 upwardly along an inclined path presenting a steering wheel to the user's arms and chest area as is known in the art. Pedals 17, 18 are provided on opposite sides of the steering wheel assembly 16. The brake pedal 17 is a pedal positioned on the left side of the steering wheel assembly 16. The accelerator pedal 18 is positioned on the right side of the steering wheel assembly 16. Each of the pedals 17, 18 is pivotally attached to chassis 11 at 19, 20 respectively.

An engine E is positioned behind the users seat S. The brake is a common band and drum type positioned at the left rear wheel 14. In order to communicate between the brake and accelerator pedals 17, 18 respectively and appropriate brake and accelerator linkage, a pair of pushrods are provided. Brake pushrod 21 extends from brake pedal 17 to brake band 23 (see FIG. 3).

Accelerator pushrod 22 extends from accelerator pedal 18 to the accelerator cable 46. Accelerator cable 46 communicates with an engine throttles to accelerate the engine from an initial idle position when the accelerator pedal 18 is released to running speeds when the accelerator pedal 18 is depressed. It should be understood that this general configuration of chassis 11, wheels 12–15, accelerator and brake pedals 19, 20, steering assembly 16, pushrods 21–22, brake 23 and engine E are known in the art. Go-karts having this overall construction have been sold for many years by Brister's Thunder Karts, Inc. of Roseland, La. Federal Trademark Registration No. 1,213,229 issued to Brister's Thunder Karts, Inc. contains a date of first use for the sale of such carts of Aug. 1, 1976.

A user can panic in certain situations, typically when using such a motorized cart in close proximity to trees, fences, or buildings. When confronted with an obstruction, the user can panic and sometimes depresses the accelerator pedal 18 when in fact the user should depress the brake pedal 17. A user can also panic and inadvertently press the accelerator pedal 18 at the same time that the user depresses the brake pedal 17.

In order to avoid a collision, the present invention provides an improved motorized cart apparatus 10 that returns the vehicle engine E to idle speed whenever the brake pedal is depressed and notwithstanding the fact that the user has simultaneously depressed the accelerator pedal 18.

Figure 4:
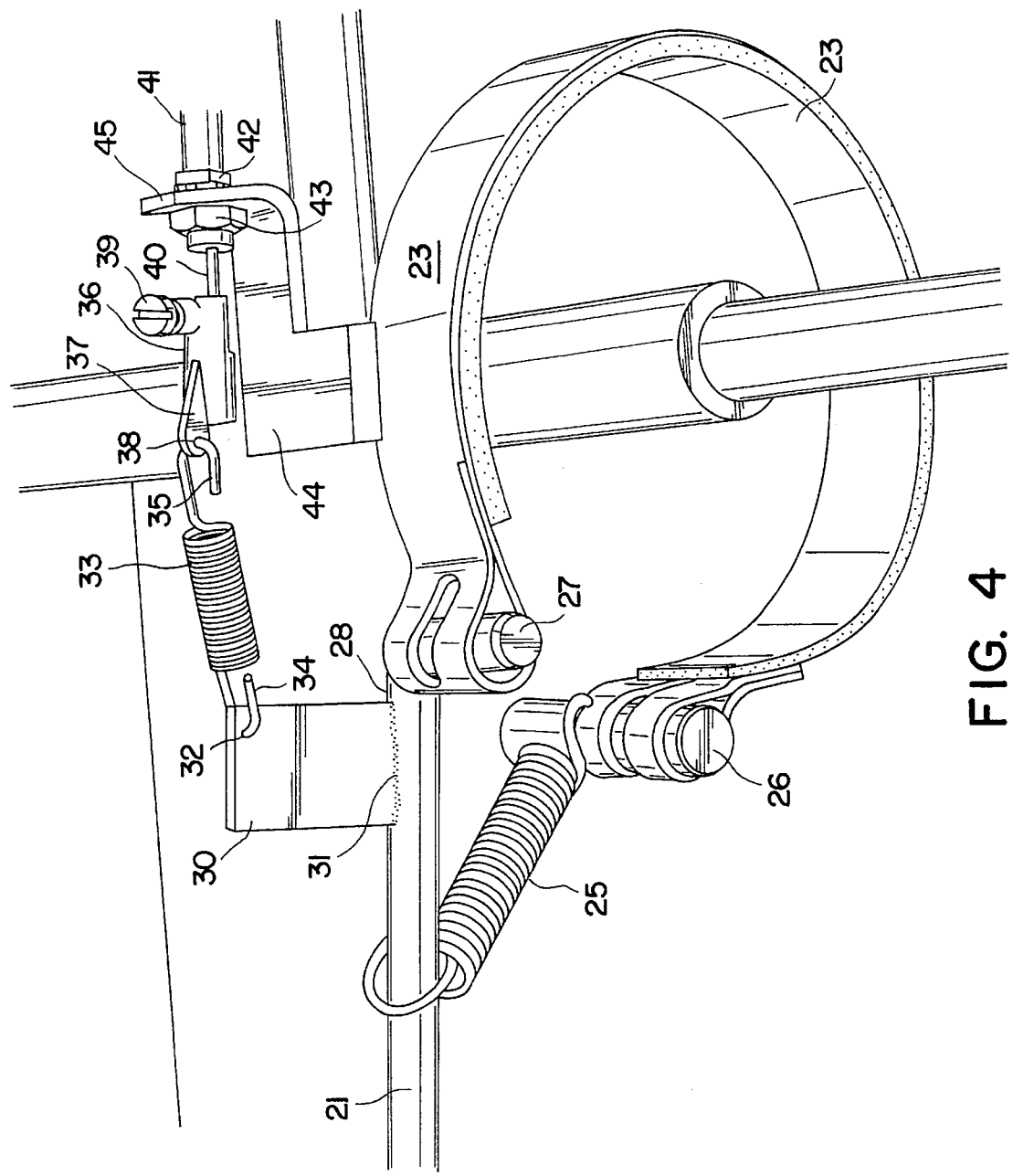
FIG. 4 is a fragmentary view of the preferred embodiment of the apparatus of the present invention illustrating the rear brake, brake pushrod and override cable.

In FIGS. 1 and 4, the brake pushrod 21 is shown having a proximal end 29 and a distal end 28. The distal end 28 is positioned adjacent the vehicle brake band 23 that is associated with the left rear wheel 14. In FIG. 4, brake pushrod 21 at its distal end 28 provides a transverse rod 27 that engages one end of brake band 23.

The brake band 23 encircles a drum (not shown) associated with the left rear wheel. It is known in the art to brake a go-kart using brake band 23 that encircles a drum associated with a rear wheel. Therefore, this brake band, drum and rear wheel assembly is somewhat schematically represented in FIG. 4.

Brake band 23 is supported upon a brake band support rod 26 that is affixed to chassis 11 by welding for example. Transverse rod 27 travels with the pushrod 21 distal end 28 so that when the user depresses the brake pedal 17, the transverse rod 27 tightens the brake band 23 against the drum in order to brake the vehicle.

Figure 3:
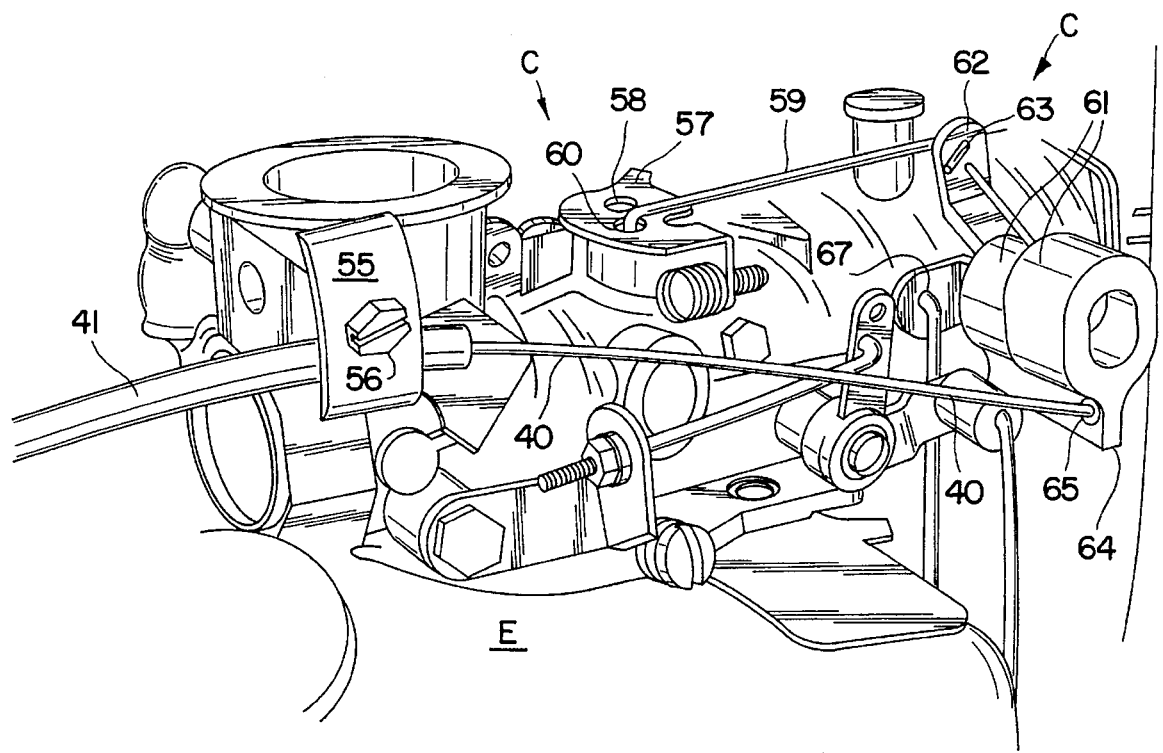
FIG. 3 is a fragmentary view of the preferred embodiment of the apparatus of the present invention.

A vertically extending and longitudinally extending flange 30 is secured at weldment 31 to pushrod distal end 28 as shown in FIG. 4. The flange 30 provides an opening 32 for attaching coil spring 33 thereto. Coil spring 33 includes a pair of spaced apart end portions in the form of hooks 34, 35. One of the hooks 34 engages opening 32 of flange 30. The other hook 35 engages opening 38 on flange 37 of connector 36. Connector 36 forms a connection between flange 30 and inner cable 40, a retractable cable having an outer cable 41. Set screw 39 can be used to rigidly affix inner cable 40 to connector 36 as shown in FIG. 3. Outer cable 41 is attached to cable support 44 using hex fitting 43. Such hex fittings 43 are commercially available.

Figure 2:
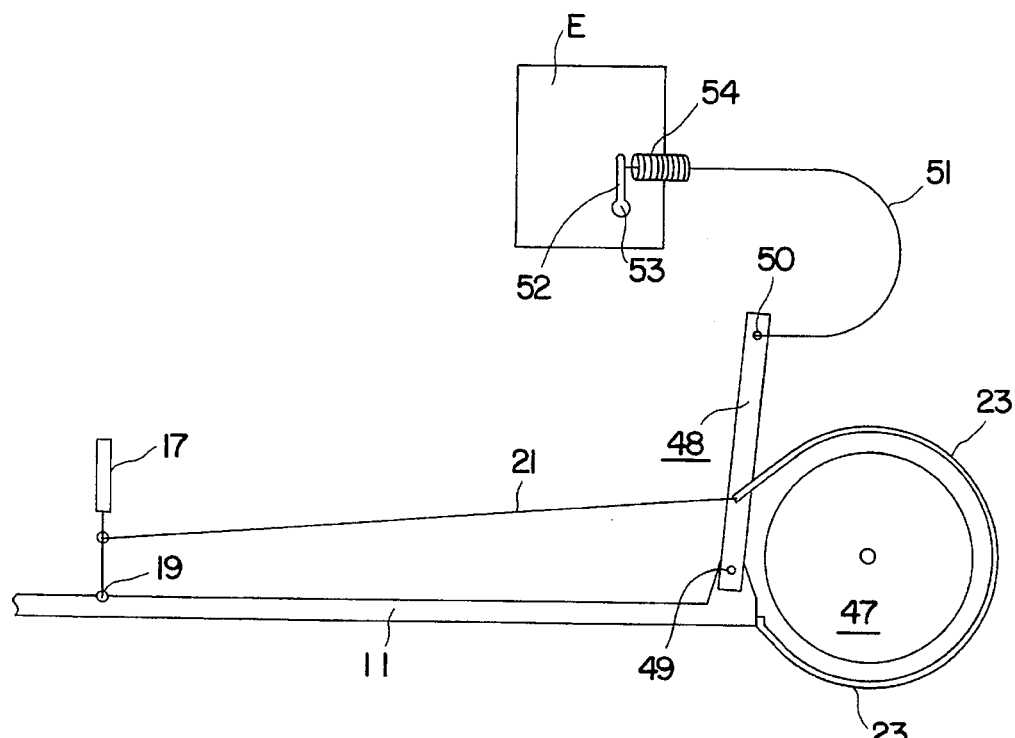
FIG. 2 is a schematic view of the preferred embodiment of the apparatus of the present invention.

In FIGS. 2–7, fragmentary views illustrate more particularly the override feature of the apparatus of the present invention. In FIG. 2, there is schematically seen vehicle chassis 11 with brake band 23 extending about brake drum 47 at the rear of the vehicle. The user depresses the pedal 17 which also moves band 23 forward pivoting lever about pivot 49 and pulling on a retractable cable 51 that is attached at opening 50 to the top of the lever 48. The retractable cable then overrides the engine E governor by pulling on governor spring 54 to return the governor 52 to an idle position. In this fashion, a depression of the brake 17 overrides the governor 52 and its spring 54 so that the governor pulls the engine throttle to idle speed. FIG. 2 shows an arrangement that could be used with a Techumseh® model HS50 five horsepower engine (EXE20654-4040), having a governor pivotally mounted to the engine block. This arrangement can similarly be used with the Honda 5.5 horsepower engine model GX160KI. The top of the governor has a link arm (not shown) that interfaces with the carburetor assembly. When cable 51 pulls the top of the governor, this overrides the governor spring to return the engine E to idle speed.

In FIGS. 3–7, a more particularly illustrated version of the apparatus 10 of the present invention as shown with reference to a Briggs & Stratton Five Horsepower Engine, Model Nos. 135202 and 136212. Owner's Manual for the models 135202 and 136212 are published by Briggs & Stratton Corporation of Milwaukee, Wis. The Owner's Manual shows the engine parts and carburetor connections in detail. With reference to FIGS. 1 and 3–7, the retractable cable 41 shown in FIG. 4 has an opposing end portion that connects to the engine E at carburetor assembly C. Cable 41 is clamped to carburetor assembly C using cable clamp 55 and bolt 58 that threadably attaches to the carburetor at an internally threaded opening not shown. Carburetor assembly C includes a butterfly valve 57 that pivotally attaches to the carburetor assembly C at pivot 58.

Link 59 extends between butterfly valve 57 and rotating member 61. Link 59 is an elongated metallic pushrod for example that is typically provided with the Briggs & Stratton engine and attaches in the manner shown in FIG. 3 to opening 60 in butterfly valve 57 and to opening 63 in flange 62 of rotating member 61. The rotating member 61 has been modified and thus has a different configuration than the configuration of a similar rotating member found on the Briggs and Stratton Engine Model No. 135202.

In FIG. 3, rotating member 61 includes flanges 62, 67 and 64. The flange 64 is not found on the commercially sold Briggs & Stratton Engine Model No. 135202 but rather as been added as a modification in accordance with the teaching of the present invention. Flange 64 has an opening 65 that receives the inner cable 40 portion of retractable cable 41. The same inner cable 40 is shown in FIG. 4 attaching to connector 36 which is secured with coil spring 33 to flange 30 and brake pushrod 21 as shown in the Figure.

Figure 7:
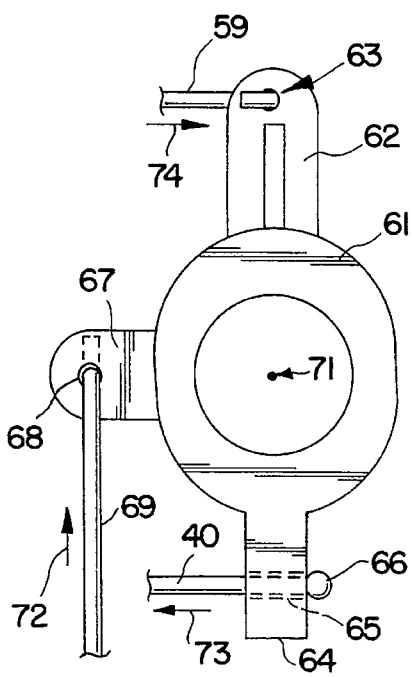
FIG. 7 is a fragmentary side view of the of the preferred embodiment of the apparatus of the present invention illustrating a portion of the override linkage.

The end of inner cable 40 that attaches to flange 64 has an enlarged button portion 66 so that when the user depresses the vehicle 10 brake pedal 17, pushrod 21 pulls in a forward direction pulling retractable cable inner cable 40 and rotating flange 64 in the direction shown as arrow 73 in FIG. 7. This also rotates the rotating member 61 about its central rotational axis 71 and thus moves that flange 67 upwardly as shown by the arrow 72 in FIG. 7 and further rotates the flange 62 clockwise in the direction of arrow 74 pulling link 74 and returning butterfly valve 57 to an idle position. Additionally, the flange 67 pulls upwardly in the direction of arrow 62 urging pushrod 69 upwardly.

Figure 5:
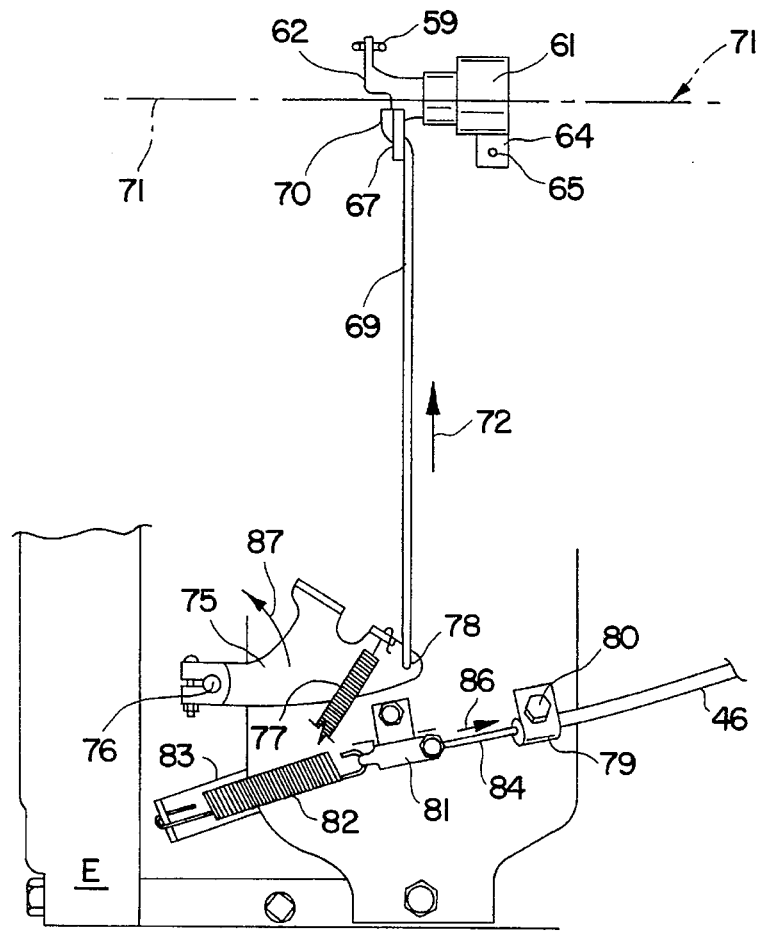
FIG. 5 is another fragmentary perspective view of the preferred embodiment of the apparatus of the present invention illustrating the override linkage at the engine.

The pushrod 69 or link member attaches at opening 68 to flange 67. An S-shaped end portion 70 can be provided as shown in FIG. 5 for forming a connection between flange 67 and link member 69. The lower end portion of link member 69 attaches to governor 75 at opening 76.

Figure 6:
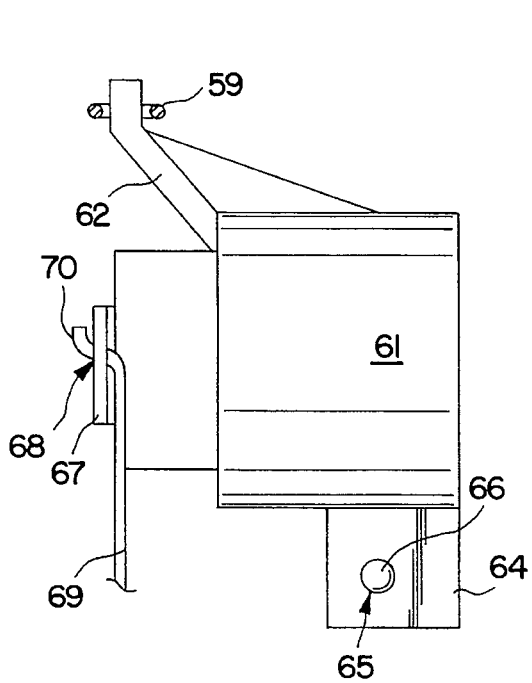
FIG. 6 is a fragmentary end view of the of the preferred embodiment of the apparatus of the present invention illustrating a portion of the override linkage.

In FIG. 5, the governor 75 is shown pivotally mounted at pivot 76 to the engine block of engine E. This is the normal position of the governor 76 and the governor spring 77 on a Briggs & Stratton model 135202 five horsepower engine. Further, on the Briggs & Stratton model 135202 engine link arm 69 typically extends from opening 78 in governor 75 to the opening 68 in flange 67 as shown in FIGS. 5–7.

Also shown in FIG. 5 is the connection of accelerator cable 46 to engine E. The cable 46 attaches at cable support 79 to engine E using a bolted connection 80. Cable 46 has an inner cable 84 that forms a connection with accelerator link 81. The link 81 attaches to return spring 82. The return spring 82 is mounted to spring support 83 that is connected to the engine E. In this fashion, when a user depresses the accelerator pedal 18, the user also moves the accelerator pushrod 22 in a forward direction as shown by the arrow 85 in FIG. 1. This moves the inner cable 84 in a forward direction as shown by the arrow 86 in FIG. 5. The inner cable 84 then pulls the accelerator link 81 in the direction of arrow 86. When the user releases the accelerator pedal 18, return spring 82 pulls the link 81 and inner cable 84 to an initial starting position. Even when the user depresses the accelerator pedal, the engine returns to idle speed if a user simultaneously depresses the brake pedal 17. With the Briggs & Stratton model 135202 engine, the cable 41 and its inner cable 40 pulls flange 64 of rotating member 61 so that governor 75 is rotated upwardly about its pivot 76 as indicated by the arrow 87 in FIG. 5. The inner cable 40 rotates that rotating member 61 so that the pushrod 69 moves upwardly in the direction of arrow 72. This pulls the governor 75 upwardly and about pivot 76 because the pushrod 69 is connected to governor 75 at opening 78. This action also overcomes an tension supplied by the governor spring 77 because the cable 40 is foot activated and applies sufficient pressure to overcome the spring 77. Thus, the rotating member pulls the governor 75 and the butterfly valve 57 to idle position, even though the user might be at the same time depressing the brake pedal 17 and the accelerator pedal 18

The following table lists the parts numbers and parts descriptions as used herein and in the drawings attached hereto.

PARTS LIST

| Part Number | Description |
| --- | --- |
| C | carburator |
| E | engine |
| 10 | self propelled cart apparatus |
| 11 | chassis |
| 12 | front wheel |
| 13 | front wheel |
| 14 | rear wheel |
| 15 | rear wheel |
| 16 | steering wheel |
| 17 | brake pedal |
| 18 | accelerator pedal |
| 19 | pivot |
| 20 | pivot |
| 21 | brake pushrod |
| 22 | accelerator pushrod |
| 23 | brake band |
| 24 | rear axle |
| 25 | spring |
| 26 | band support rod |
| 27 | transverse rod |
| 28 | pushrod distal end |
| 29 | pushrod proximal end |
| 30 | flange |
| 31 | weldment |
| 32 | opening |
| 33 | coil spring |
| 34 | hook |
| 35 | hook |
| 36 | connector |
| 37 | flange |
| 38 | opening |
| 39 | set screw |
| 40 | inner cable |
| 41 | outer cable |
| 42 | cable end portion |
| 43 | hex fitting |
| 44 | cable support |
| 45 | vertical flange |
| 46 | accelerator cable |
| 47 | brake drum |
| 48 | lever |
| 49 | pivot |
| 50 | opening |
| 51 | retractable cable |
| 52 | governor |
| 53 | pivot |
| 54 | coil spring |
| 55 | cable clamp |
| 56 | bolt |
| 57 | butterfly valve |
| 58 | pivot |
| 59 | link |
| 60 | opening |
| 61 | rotating member |
| 62 | flange |
| 63 | opening |
| 64 | flange |
| 65 | opening |
| 66 | enlarged end |
| 67 | flange |
| 68 | opening |
| 69 | link |
| 70 | s-shaped end portion |
| 71 | center of rotation |
| 72 | arrow |
| 73 | arrow |
| 74 | arrow |
| 75 | governor |
| 76 | pivot |
| 77 | governor spring |
| 78 | opening |
| 79 | cable holder |
| 80 | bolted connection |
| 81 | accelerator link |
| 82 | return spring |
| 83 | spring support |

-continued

PARTS LIST

| Part Number | Description |
| --- | --- |
| 84 | inner cable |
| 85 | arrow |
| 86 | arrow |
| 87 | arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A motorized cart apparatus comprising:
   a) a horizontal cart frame having front and rear end portions;
   b) a wheelbase defined by a pair of front, steerable wheels and a pair of rear wheels;
   c) a seat positioned between the front and rear wheels;
   d) a motor drive positioned at the rear end portion of the frame, behind the seat and adjacent the rear wheels;
   e) brake means on at least one of the rear wheels for braking at least one of the rear wheels;
   f) a throttle for controlling the motor drive;
   g) a pair of movable pedals positioned on the frame in front of the seat at the front end portion of the frame, adjacent the front wheels, each of the pedals being inclined relative to the horizontal frame during use, positioned to be operated by a users feet, one of the pedals defining an accelerator pedal, the other pedal defining a brake pedal;
   h) a brake pushrod extending from the brake pedal to the brake means so that when the brake pedal is depressed, the brake pushrod activates the brake means;
   i) a throttle pushrod extending from the accelerator pedal to the throttle so that when the accelerator pedal is depressed, the throttle is activated;
   j) a linkage extending from a combination of the brake pedal and brake pushrod to the throttle for placing the throttle in the idle position when the brake pedal and accelerator pedal are simultaneously depressed as when the cart driver panics.

2. The apparatus of claim 1 wherein the linkage includes a rotating member mounted on the motor drive.

3. The apparatus of claim 1 wherein the linkage extends from the pushrod at a position adjacent the rear wheels.

4. The apparatus of claim 1 wherein the brake means includes a brake drum and a brake band, and the brake pushrod tightens the brake band about the brake drum.

5. The apparatus of claim 1 further comprising an inclined steering assembly that includes a steering rod affixed to the frame at a position generally in between the front steerable wheels and a steering wheel that is supported on the steering rod at a position elevated above the frame.

6. The apparatus of claim 5 wherein the pedals are positioned respectively on opposite sides of the steering rod.

7. The apparatus of claim 1 wherein the motor drive includes an engine governor, and the linkage includes a cable that extends from the combination of the brake pedal and the brake pushrod to the engine governor.

8. The apparatus of claim 1 wherein the linkage includes a bellcrank on the motor drive, a plurality of links extending from the bellcrank in respective horizontal and vertical directions including a horizontal link and a vertical link, and a flexible cable extending from the brake pushrod to the bellcrank.

9. The apparatus of claim 8 wherein motor drive includes an engine governor, and the linkage includes a flexible cable that extends from the brake pushrod to the bellcrank, and the vertical link extends between the bellcrank and the engine governor.

10. The apparatus of claim 9 further comprising a butterfly valve as part of a carburetor assembly, the horizontal link extends from the butterfly valve to the bellcrank, and the vertical link extends between the bellcrank and the engine governor.

* * * * *